(12) United States Patent
Josan et al.

(10) Patent No.: US 6,857,082 B1
(45) Date of Patent: Feb. 15, 2005

(54) METHOD FOR PROVIDING A TRANSITION FROM ONE SERVER TO ANOTHER SERVER CLUSTERED TOGETHER

(75) Inventors: Nripjeet Singh Josan, Mission Viejo, CA (US); Brenda Ann Moreno, Mission Viejo, CA (US)

(73) Assignee: Unisys Corporation, Blue Bell, PA (US)

( * ) Notice: Subject to any disclaimer, the term of this patent is extended or adjusted under 35 U.S.C. 154(b) by 864 days.

(21) Appl. No.: 09/717,929

(22) Filed: Nov. 21, 2000

(51) Int. Cl.⁷ .................................................. G06F 11/00
(52) U.S. Cl. ............................................. 714/4; 714/13
(58) Field of Search ................................. 714/4, 10, 11, 714/12, 13

(56) References Cited

U.S. PATENT DOCUMENTS

| | | | |
|---|---|---|---|
| 5,852,724 A | | 12/1998 | Glenn et al. |
| 6,134,673 A | | 10/2000 | Chrabaszez |
| 6,314,526 B1 | * | 11/2001 | Arendt et al. .................. 714/4 |
| 6,438,705 B1 | * | 8/2002 | Chao et al. ..................... 714/4 |
| 2001/0008019 A1 | * | 7/2001 | Vert et al. ...................... 714/1 |
| 2002/0049845 A1 | * | 4/2002 | Sreenivasan et al. ....... 709/226 |
| 2004/0049573 A1 | * | 3/2004 | Olmstead et al. ........... 709/224 |

* cited by examiner

Primary Examiner—Scott Baderman
(74) Attorney, Agent, or Firm—Nathan Cass; Mark T. Starr; Lisa A. Rode

(57) ABSTRACT

The method of the present invention is useful in a computer system including at least two server nodes, each of which execute clustered server software. The program executes a method for providing a transition from a first server node to a second server node. The method includes the steps of responding to a request for the transition and initiating a thread for effecting the transition from the first server node to the second server node. Next, determining if a shared resource is owned by the second server node and if not, calling a driver to enable functionality of the transition, which transition sets up the shared resource access to the second server node.

12 Claims, 11 Drawing Sheets

PRONFS_SHARE OPEN REQUEST

PRONFS_SHARE ONLINE REQUEST

ONLINE THREAD

ONLINE THREAD

PRONFS_SHARE
OFFLINE REQUEST

OFFLINE THREAD

OFFLINE THREAD

PRONFS_SHARE CLOSE REQUEST

METHOD FOR PROVIDING A TRANSITION FROM ONE SERVER TO ANOTHER SERVER CLUSTERED TOGETHER

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention generally relates to the field of clustered computer systems and in particular to a method for providing transition from one server to another server while actively running applications on both servers, wherein both servers are clustered together and executing one operating system while clients coupled to the cluster are operating a second operating system.

BACKGROUND OF THE INVENTION

In a single computer network, clustering application software allows resources, or interfaces, to be executed by more than one server, or node, within the network. Clustered servers increase efficiency and play a vital role in handling complex business transactions.

A transition occurs when a resource is made available or unavailable on a given node. A transition can be classified as a failover or a failback. When a failover occurs, the resource is made available on a node via an online request. During failback, the resource is no longer made available on a node via an offline request.

An online request generally occurs when one node in a cluster goes down and the resource is needed on the surviving node. Failover enables the resources owned by the failed node to be taken over by the surviving node. Failover is complete when all of the node's resources are online on the new node.

An offline request generally occurs when a server node that has failed is restored. When the failed server node becomes active again, failback brings all the resources that were transitioned during failover back to the original node. Failback is complete when all the transitioned resources are restored to the original node via an online request and removed from the remaining node via an offline request.

Applications that are not cluster-aware will not failover to the surviving node in the case of a server failure. This causes stoppage of all the client jobs running on the failed node and loss of access to the resources on that node. The application has to wait for the server to come back up to resume the jobs. This proves to be a time-consuming and inefficient process.

Cluster-aware applications do not face this problem. If a node in the cluster goes down, the application fails over to the second node in the cluster and the client jobs continue without any interruption. The surviving cluster node picks up where the failed server left off. And when the failed node becomes available again, resources transitioned during failover are transitioned back to the original node during failback. Clients connected to the clustered servers need not know that a server failure occurred.

One prior art clustering system to which the method of the present invention generally relates is described in U.S. Pat. No. 5,964,886, entitled HIGHLY AVAILABLE CLUSTER VIRTUAL DISK SYSTEM. In this system, a cluster implements a virtual disk system that provides each node of the cluster access to each storage device of the cluster. The virtual disk system provides high availability such that a storage device may be accessed and data access requests are reliably completed even in the presence of a failure.

The method of the present invention makes use of a clustering system using a virtual disk system. Instead of implementing the clustering system, the method of the present invention builds upon the system, adding an additional type of resource capable of failover and failback. Thus, when one node in the cluster goes down or becomes inactive for any reason, the method of the present invention enables all the resources owned by that node to be taken over by the other node in the cluster.

Another prior art clustering system to which the method of the present invention generally relates is described in U.S. Pat. No. 5,852,724, entitled SYSTEM AND METHOD FOR "N" PRIMARY SERVERS TO FAIL OVER TO "1" SECONDARY SERVER. This invention is directed toward a system and method for server back-up. A set of Primary servers and at least one secondary server is coupled to a set of networks. Upon detecting a primary server status that indicates that a primary server is inoperative, the secondary server starts the duplicate set of the primary set of services corresponding to the now inoperative primary server.

The method of the present invention does not make use of a duplicate set of the primary services. Instead, the services, called resources, are transitioned immediately upon server failure. Before the failure, each server in the method of the present invention is capable of running its own resources. When one server goes down, the failed server transitions all of its resources to the remaining node. In the method of the present invention, groups of resources are brought online on the remaining server instead of using duplicate sets of the resources. Additionally, the resources become available on the remaining node when a server failure occurs.

Still another prior art clustering system to which the method of the present invention generally relates is detailed in U.S. Pat. No. 6,134,673, entitled METHOD FOR CLUSTERING SOFTWARE APPLICATIONS. This prior art method allows for fault tolerant execution of an application program in a server network having a first and second server, wherein the method includes: executing the application program in the first server; storing an object which represents the program in a cluster network database, wherein the object contains information pertaining to the program; detecting a failure of the first server; and executing the application program in the second server upon detection of the failure of the first server, in accordance with the information in the object.

The method of the present invention builds upon the above-mentioned clustering software. U.S. Pat. No. 6,134,673 describes a clustered server capable of detecting a failure in one server and executing the same application program in the second server. The method of the present invention is different because the application on each server is capable of running independently prior to a failure. In the event of a failure, resources from the failed server are transitioned to the remaining server node. Because the resources remain available to the client applications, clients connected to the clustered server need not know that a server failure occurred.

The concept of cluster-awareness is not a new one. However, previous implementations of cluster-aware applications require both servers to have identical configurations of the software being executed before a server failure occurs. In the event of a server failure, the applications are executed on the remaining server node. If a server failure does not occur, however, only one copy of the application is running. The remaining copy of the application is never utilized. Thus, the need arises to provide transitions from one server node to another while actively running the application on both servers.

SUMMARY OF THE INVENTION

It is therefore an object of the present invention is to provide a successful transition from one server to another, wherein both servers are clustered together and executing one operating system while clients coupled to the cluster are operating a second operating system.

Still another object of the present invention is to provide a seamless transition capability for proprietary systems like Windows NT or Windows 2000 interoperating with clients running on software such as Unix.

Still another object of the present invention is to allow both servers to simultaneously run different resources and to transition resources running on the failed server to the surviving server.

Yet another object of the present invention is to provide constant availability of the resources even when a server failure occurs.

The method of the present invention is useful in a computer system including at least two server nodes, each of which execute clustered server software. The program executes a method for providing a transition from a first server node to a second server node. The method includes the steps of responding to a request for the transition and initiating a thread for effecting the transition from the first server node to the second server node. Next, determining if a shared resource is owned by the second server node and if not, calling a driver to enable functionality of the transition, which transition sets up the shared resource access to the second server node.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

BRIEF DESCRIPTION OF THE DRAWINGS

FIG. 3 is a block diagram illustrating the available requests from MSCS that the Resource DLL can respond to.

DETAILED DESCRIPTION OF ONE EMBODIMENT

Before proceeding with a detailed description of the method of the present invention a background discussion of resources and their role in clustering may be helpful. In general, a resource is any component in a cluster that can be brought online and taken offline on a given server node. In the present invention, all resources made capable of transitioning are PRONFS resources. A PRONFS resource is a resource that defines the exported access to a logical volume. Clients interfacing with the clustered server have access to these resources.

In the method of the present invention, both servers are capable of running different resources at the same time. In the event of a server failure, all resources from the failed server are transitioned to the remaining server node. Once the resources are moved, they become available for client use again. The client need not know one of the nodes in the clustered server failed.

Figure 1:
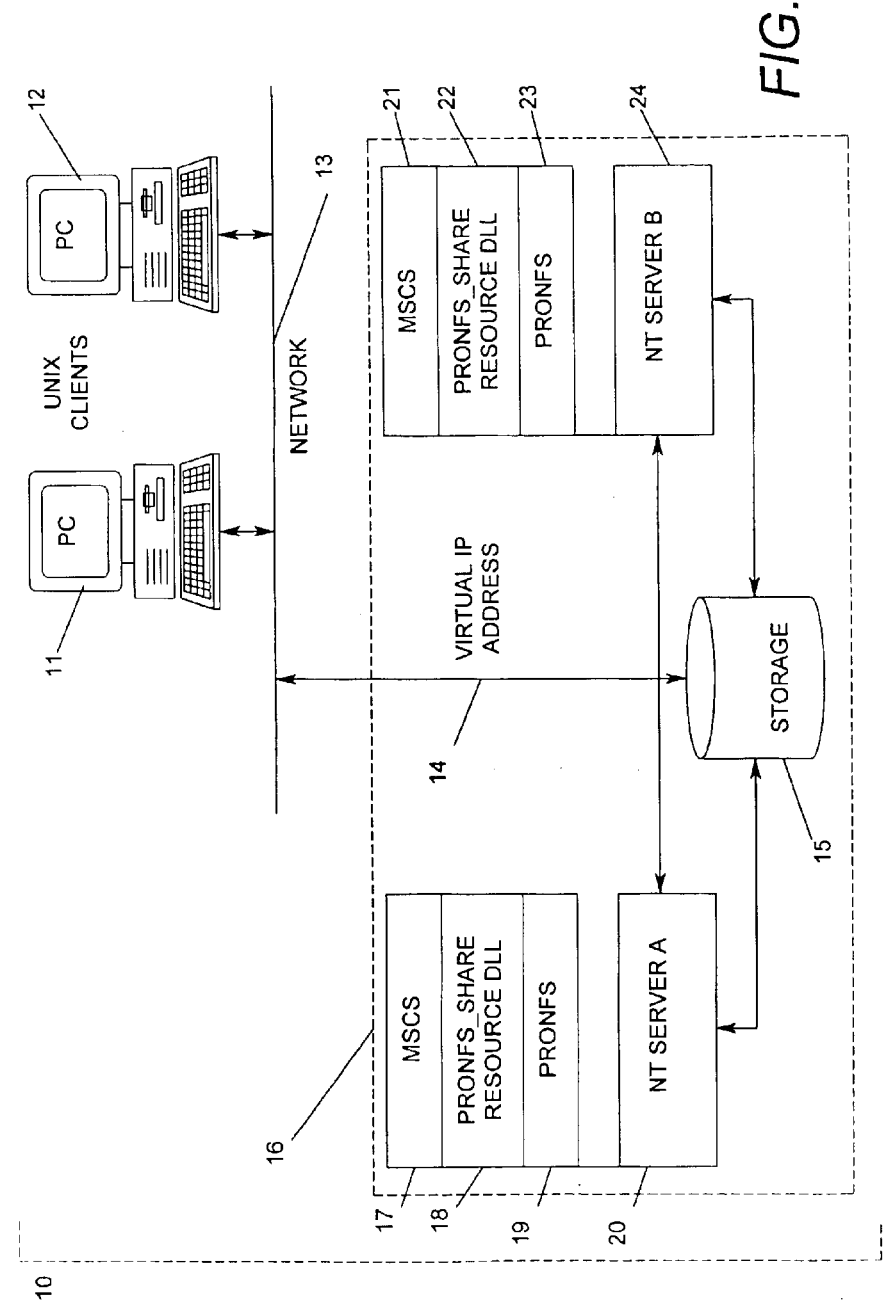
FIG. 1 is a generalized block diagram of a system that may use the method of the present invention.

Referring now to the drawings and FIG. 1 in particular, a block diagram of a computer system is shown of a client-server network 10 including PC clients 11 and 12 typically executing UNIX operating systems; and a clustered server 15 typically executing NT operating system. PC clients 11 and 12 are connected via a network 13 and interface with the clustered server 15 through a virtual IP address 14. The clustered server contains two nodes designated NT Server A 20 and NT Server B 24. The NT Server A 20 is further comprised of a Microsoft Cluster Server (MSCS) software 17, which is available from Microsoft Corporation, Redmond, Wash., a Resource DLL 18, and a PRONFS driver 19. The NT Server B 24 contains similar software, namely a MSCS 21, a Resource DLL 22, and a PRONFS driver 23. The NT Server A 20 and the NT Server B 24 share a common storage device 15.

Figure 2:
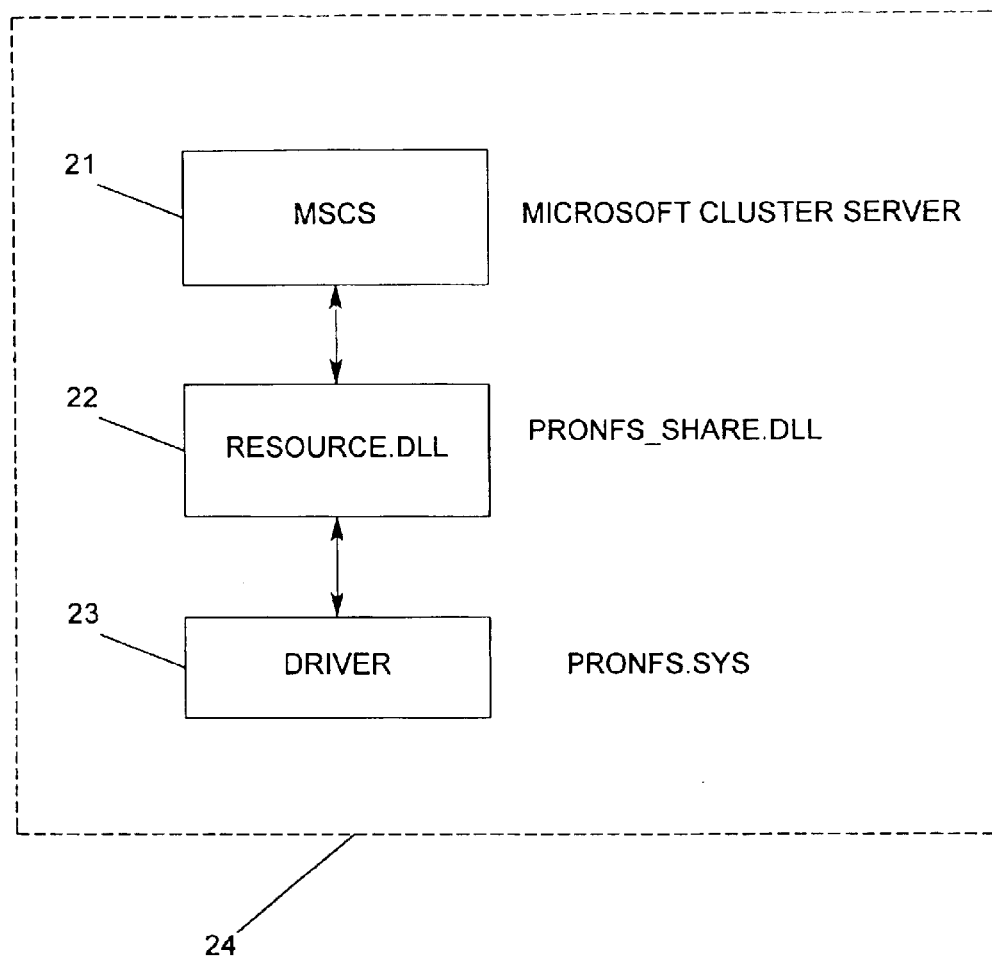
FIG. 2 is a block diagram illustrating one node in the clustered server and how the Resource DLL interfaces with the product's driver.

With reference to FIG. 2, a diagram illustrating one node in the clustered server and how the Resource DLL 22 interfaces with the product's driver 23 is shown. Each node requires the use of cluster server software, typically a MSCS software 21. The Resource DLL 22 interfaces between the MSCS 21 and with a driver 23.

A device driver is code that communicates with or simulates the presence of a hardware device. It links the device with the operating system, making the device available to the operating system and applications through an interface. Device drivers can access their devices directly if the devices are mapped into system memory. If devices are not mapped into system memory, device drivers may need to use the services of drivers that are closer to the hardware, namely lower-level drivers, in order to access their devices.

With reference to FIG. 2, the driver 23 is an added software component of the NT Server B 24. It controls the availability of shares on the NT Server B 24. The driver 23 responds to the requests from the Resource DLL 22 to make a share available or unavailable depending upon whether the Resource DLL issues an online or an offline request.

Figure 3:
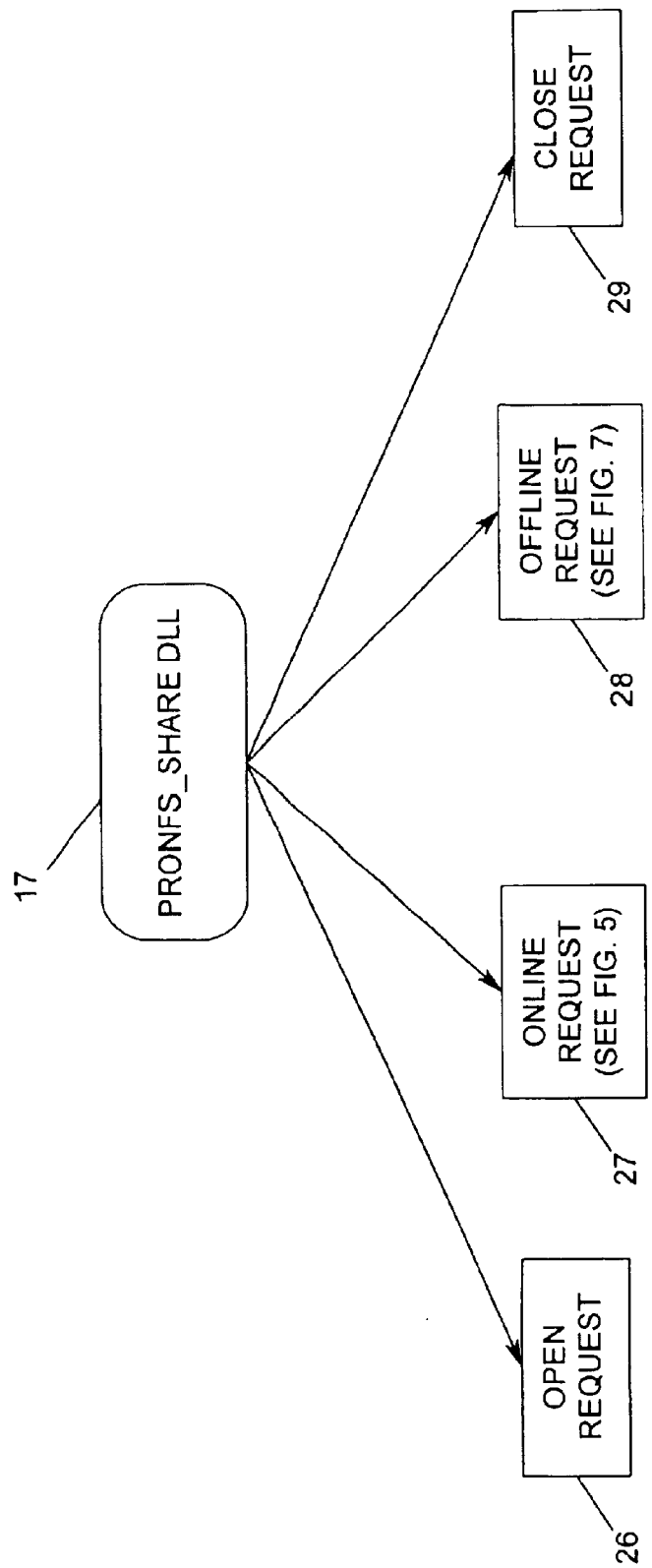

Referring now to FIG. 3, a block diagram illustrating the available requests from the MSCS 21 that the Resource DLL 22 can respond to is shown. Based upon an action from the MSCS 21, the Resource DLL 22 can respond to an open request 26, bring a resource online via an online request 27, bring a resource offline via an offline request 28, and make a close request 29. An online request 27 consists of initiating an online thread, a process further explained in FIGS. 6A and 6B. An offline request 28 consists of initiating an offline thread, a process further explained in FIGS. 8A and 8B.

Figure 4:
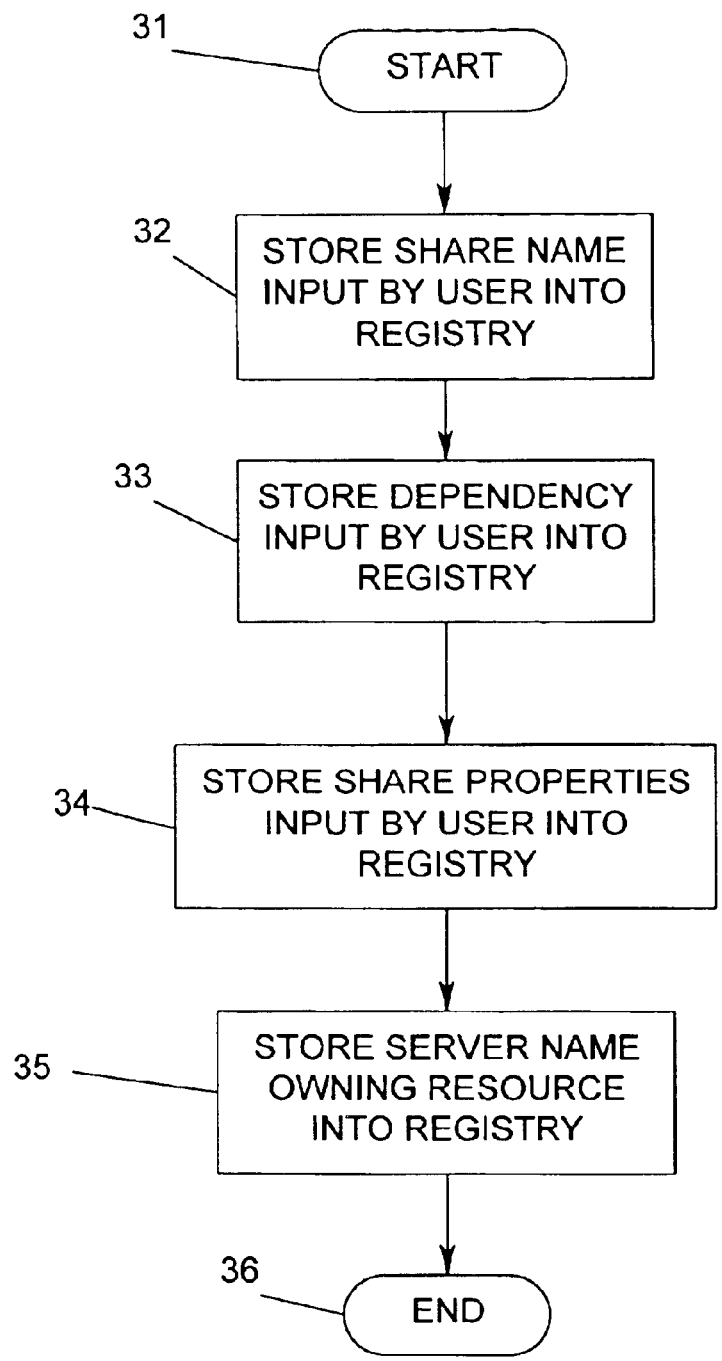
FIG. 4 is a flowchart that illustrates the steps for an open request.

With reference to FIG. 4, a flowchart illustrating the steps for an open request is shown. An open request involves creating a share, or resource, on either the NT Server A 20 or the NT Server B 24. The process begins with start bubble 31 followed by a process step (block 32) or storing the name input by the user into the server's registry. The process then continues with a process step (block 33) of storing dependency for a disk drive into the registry. After dependency information is stored, the share properties are stored into the registry (block 34). A share property defines the exported access to a logical volume. The process continues with a process step (block 35) of storing the server name associated with the resource into the registry. The process then ends (block 36).

Figure 5:
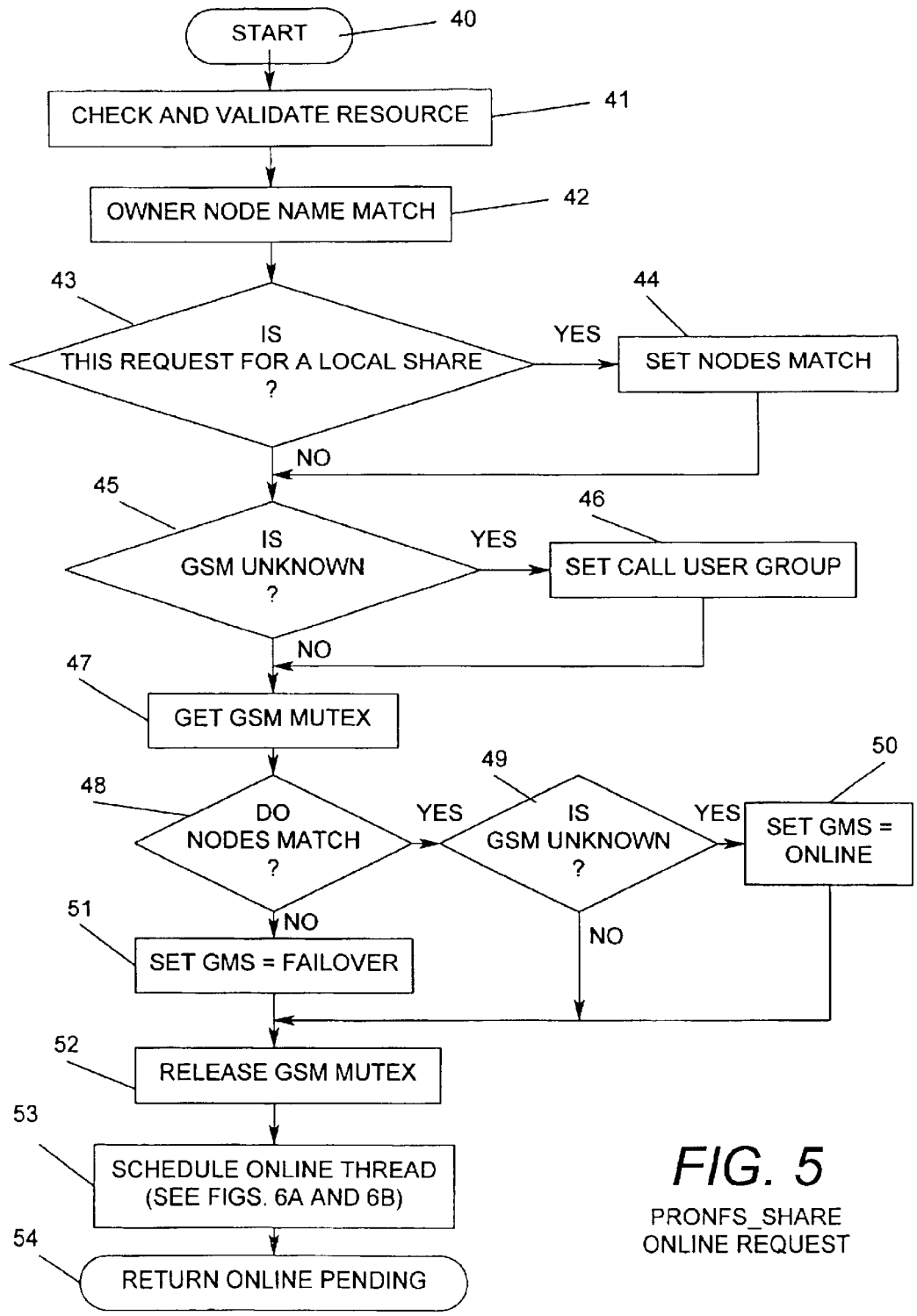
FIG. 5 is a flowchart that illustrates the steps for enabling failover for an online request.

Referring now to FIG. 5, a flowchart illustrating the steps for enabling failover for an online request is shown. The process begins with a start bubble 40 followed by a process step (block 41) to check and validate the resource. Once the resource has been validated, process step (block 42) calls a function called Owner Node Name Match. This function returns true when the local server owns the resource, and false when the remaining server node owns the resource. Based on the value returned from this function call, the process continues with an inquiry as to whether or not the request is for a local share (diamond 43). If the answer to this inquiry is yes, the boolean Nodes Match is set to true (block 44). If the answer to this is no, the variable Nodes Match remains false, meaning that the resource does not reside on the local server node. The process continues with an inquiry as to whether or not the state of the Global State Machine (GSM) is unknown (diamond 45). The GSM represents the current state of the Resource DLL 22. If the answer to the inquiry is yes, process step 46 sets a boolean variable Call User Group to true. Call User Group is set to true when a task needs to be done to the driver 23 during transition. If the answer to decision diamond 45 is no, the boolean variable Call User Group remains false. Process step (block 47) then gets the GSM Mutex, which protects the resource from being written to more than once at a given time. This is followed by an inquiry as to whether Nodes Match is set to true (diamond 48). If the answer to this is no, then the state of the GSM is set to Failover (block 51). On the other hand, if Nodes Match is true, meaning the share resides on the local server, then another inquiry is made as to whether the GSM is unknown (diamond 49). If the answer to this is yes then a process step (block 50) is performed of setting the state of the GMS to online. If the answer to decision diamond 49 is no, then the GSM state is not reassigned. Process block 52 then releases the GSM Mutex. This is followed by a process step (block 53) to schedule the online thread. Handling the separate thread is further explained in FIGS. 6A and 6B. After scheduling the thread, the process returns the status of online pending (block 54).

Figure 6A:
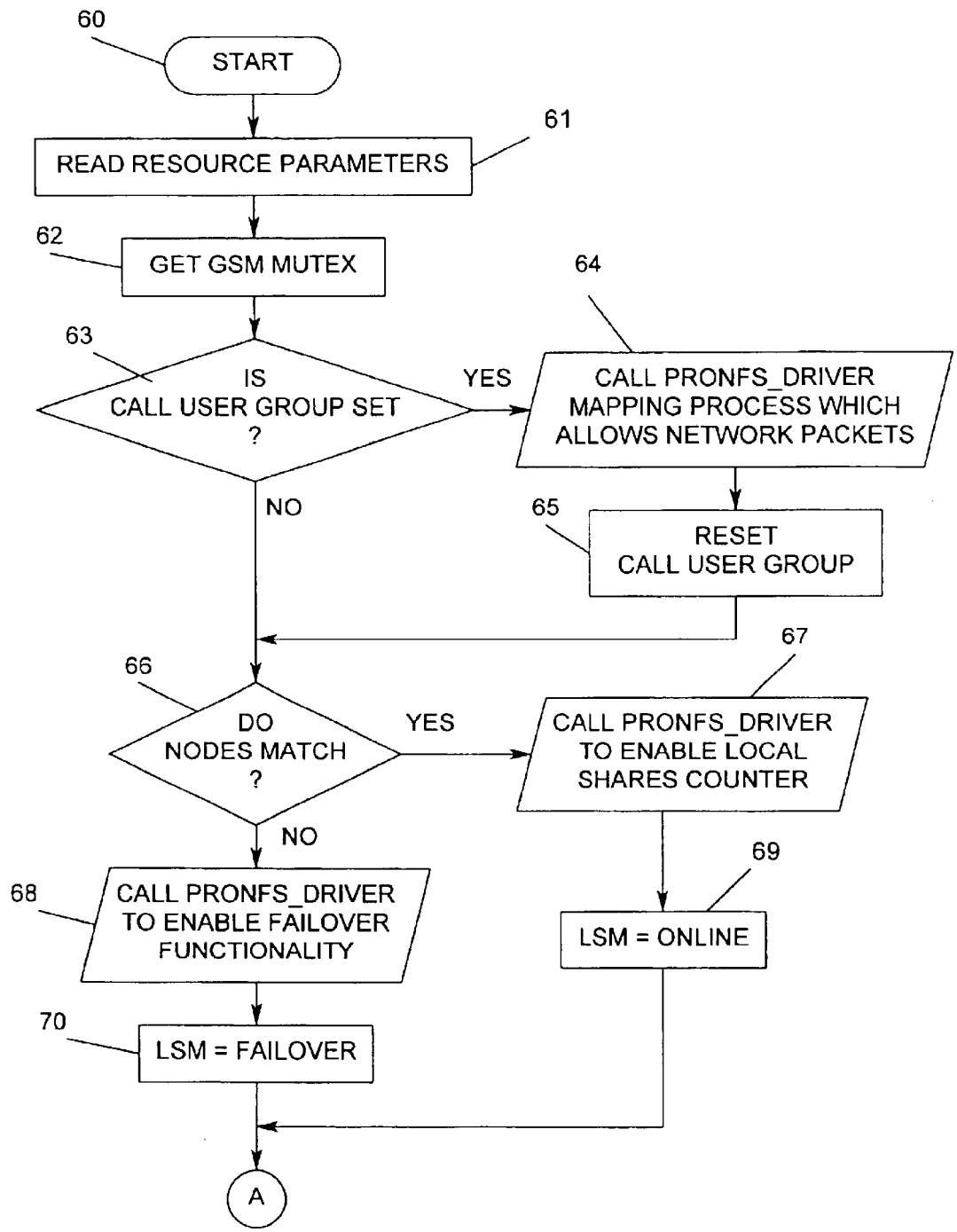
FIGS. 6A and 6B combined form a flowchart that illustrates the steps for a separate thread of execution generated by the online request in FIG. 5.
Figure 6B:
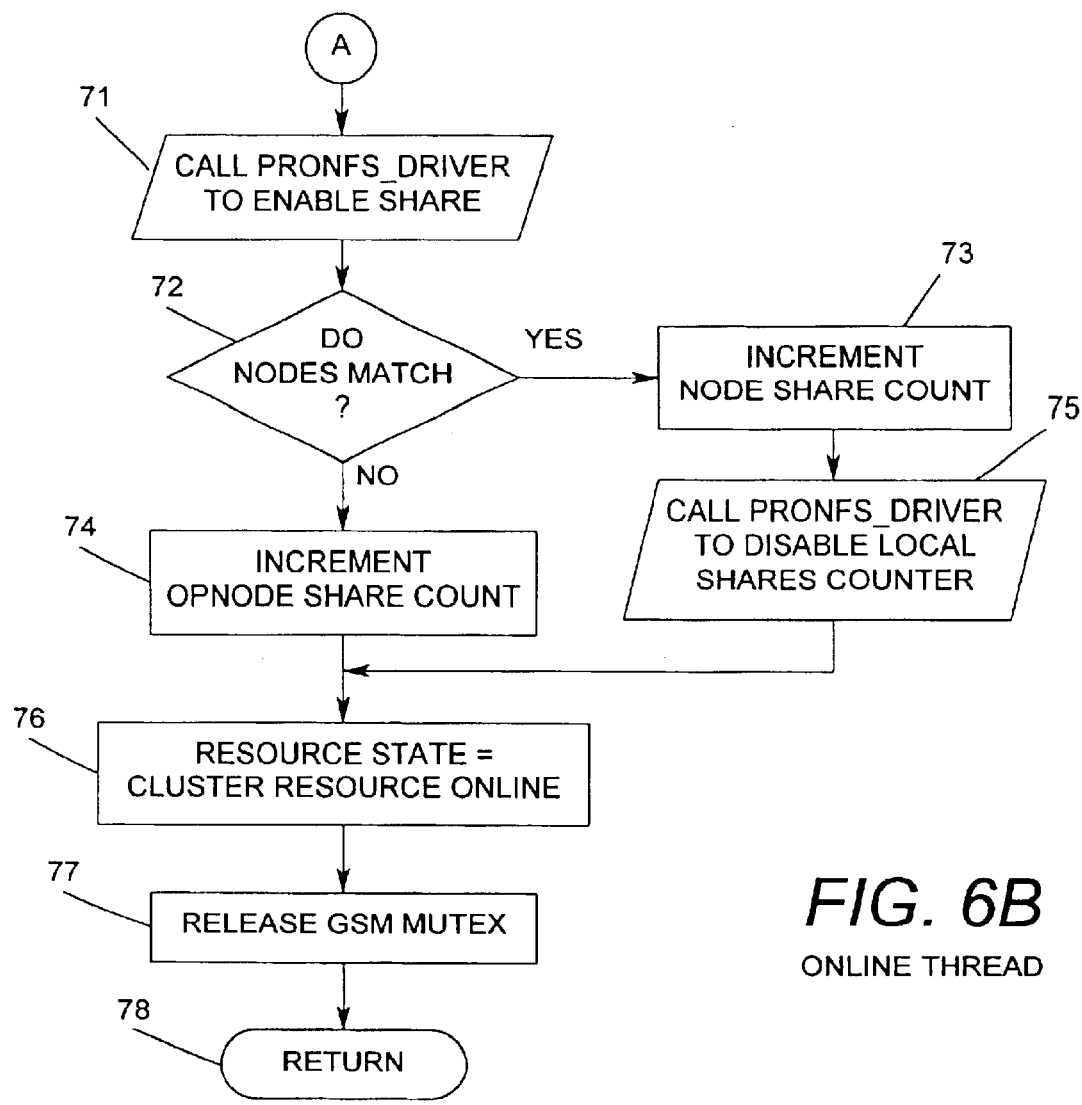

With reference to FIGS. 6A and 6B, the routine of scheduling the online thread is shown. Before proceeding with the online thread process, a brief explanation of the difference in block shape used during process flow may be helpful. All parallelogram blocks represent calls to the driver 23. These process steps involve the Resource DLL 22 interfacing with the driver 23 in some way. Process steps not involving a call to the driver 23 are shown as rectangular blocks. The process begins with start bubble 60, followed by a step of reading the resource parameters (block 61) passed in by the online process described in FIG. 5. Process step (block 62) then gets the GSM Mutex, which protects the resource from being written to multiple times. Next, a decision is made as to whether or not the boolean variable Call User Group is true (decision diamond 63). Call User Group is true when a task needs to be done to the driver 23 during transition. If the answer to this inquiry is yes, a call to the driver 23 is made (block 64). During this process step, the Resource DLL 22 interfaces with the driver 23, sending a signal that network packets are allowed. This is followed by resetting the boolean Call User Group back to false (block 65). If the answer to decision diamond 63 is no, no signal is sent to the driver 23. The process continues with an inquiry as to whether or not the Nodes Match boolean variable is true, (decision diamond 66). Nodes Match is true when the request is for a local share. If the answer to this inquiry is yes, the Resource DLL 22 interfaces with the driver 23 and enables the local shares counter block 67), and the status of the Local State Machine (LSM) is set to online (block 69). The LSM represents the current state of the resource. If the answer to decision diamond 66 is no, the driver 23 enables failover functionality (block 69), and the status of the LSM is set to Failover (block 70). Next, the Resource DLL 22 signals the driver 23 to enable shares (block 71). Decision diamond 72 then decides whether or not the Nodes Match variable is set. If the answer to this is yes, process step (block 73) increments the Node Shares Count and the driver 23 disables the local shares counter (block 75). If the answer to the inquiry is no, however, OPNode Count is incremented (block 74). Next, the Resource State variable is assigned the value of Cluster Resource Online (block (76). After Resource State has been set, process step (block 77) releases the GSM Mutex, allowing other programs to write to the resource. The process then exits (block 78).

Figure 7:
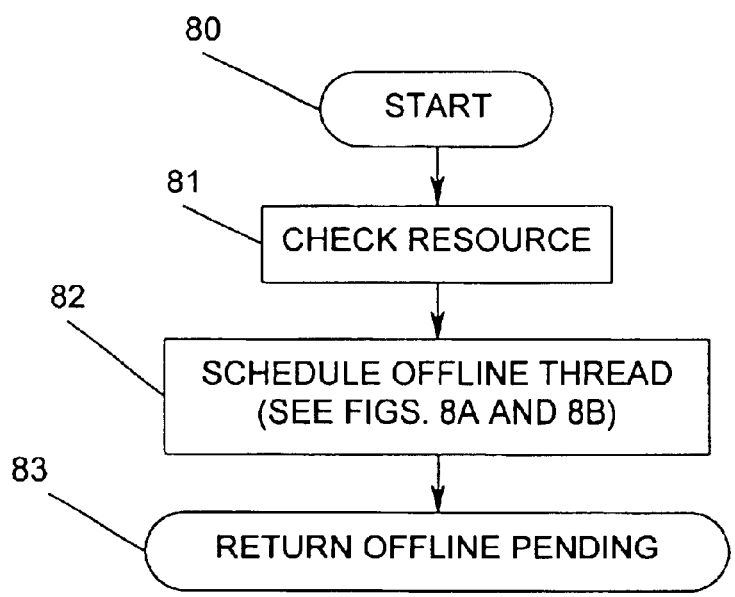
FIG. 7 is a flowchart that illustrates the steps for enabling failback for an offline request.

Referring now to FIG. 7, the steps for enabling failback for an offline request is shown. The process begins with start bubble 80, followed by a process step (block 81) to check and validate the offline resource. An offline thread is then scheduled (block 82). The offline thread process is further explained in FIGS. 8A and 8B. After the thread has been scheduled, the process returns a status of offline pending (block 83).

Figure 8A:
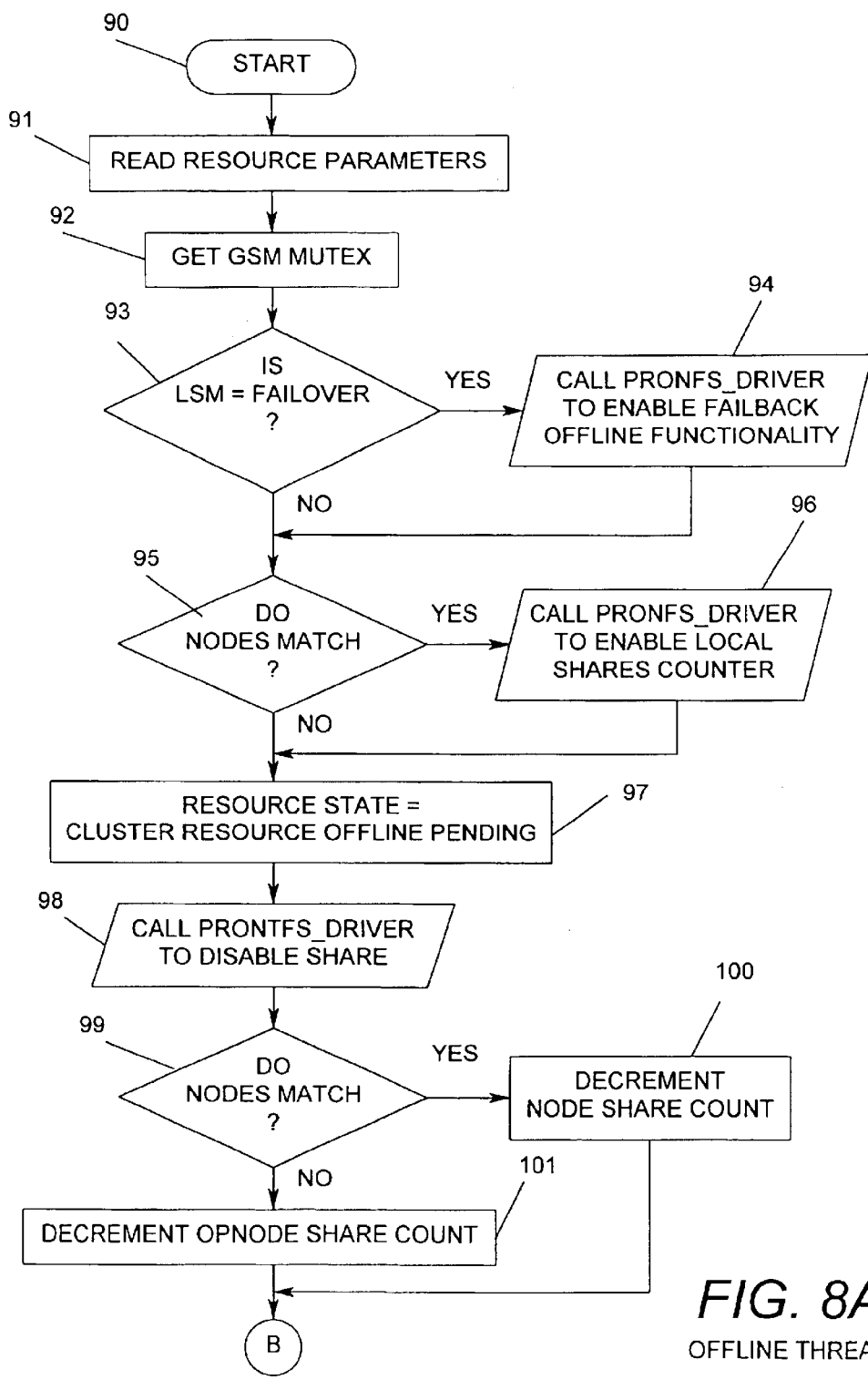
FIGS. 8A and 8B combined form a flowchart that illustrates the steps for a separate thread of execution generated by the offline request in FIG. 7.
Figure 8B:
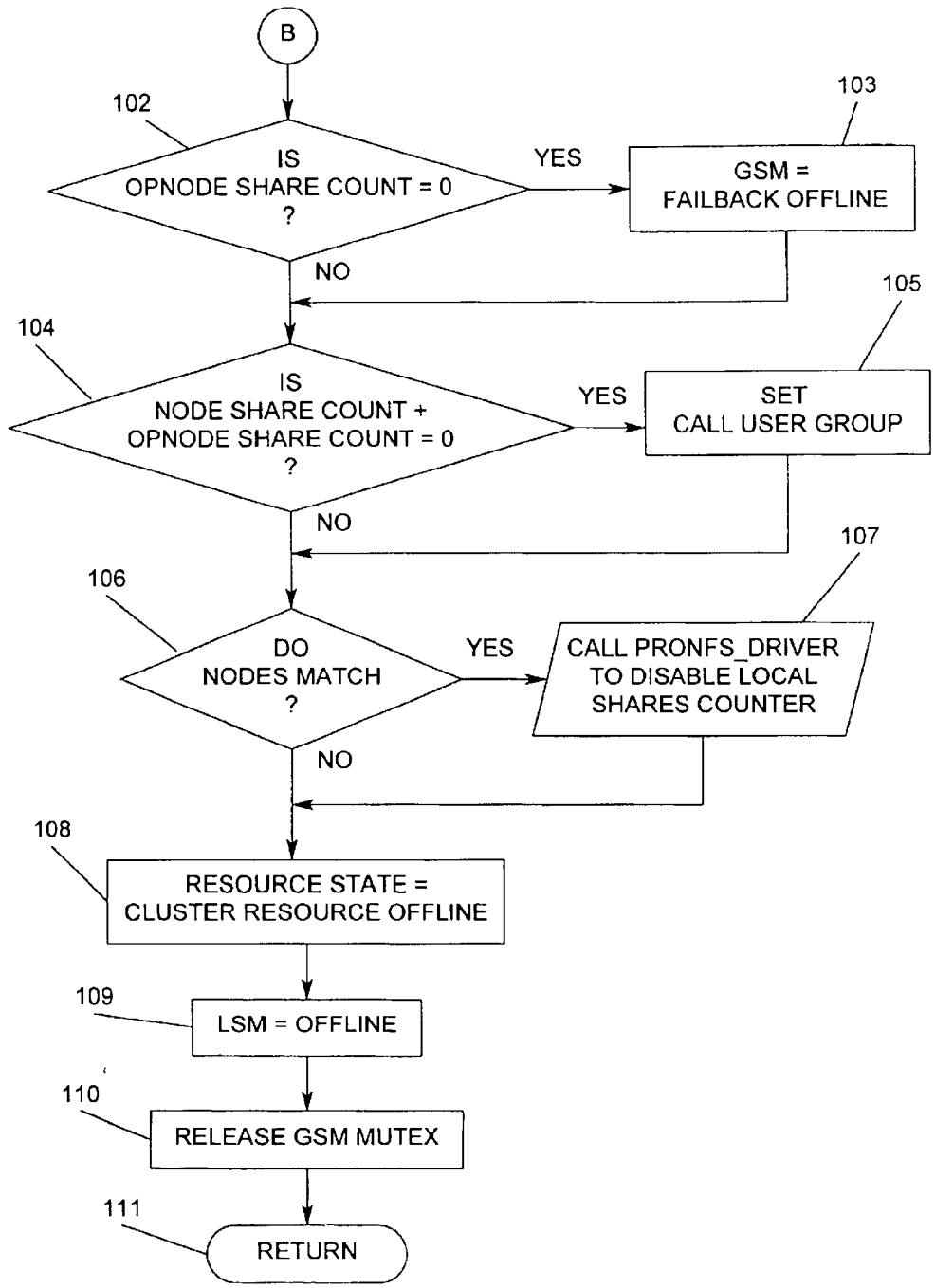

With reference to FIGS. 8A and 8B, the routine of scheduling the offline thread is shown. The process begins with start bubble 90. Process step (block 91) then reads the resource parameters passed in by the offline process described in FIG. 7. Process step (block 92) then gets the GSM Mutex, protecting the resource from being written to more than once at a given time. Decision diamond 93 then decides whether or not the status of the LSM is Failover. If so, the driver 23 enables functionality for the transition (block 94). Otherwise, no call to the driver 23 is made. The process continues with an inquiry as to whether or not the Nodes Match boolean variable is true (decision diamond 95). Nodes Match is true when the request is for a local share. If the answer to the inquiry is yes, the driver 23 enables the Local Shares Counter (block 96). The Local Shares Counter keeps a running tally of all local shares for the driver 23. If the answer to decision diamond 95 is no, no call to the driver 23 is made. Process step (block 97) then sets the Resource State for the MSCS 21 to Cluster Resource Offline Pending, thus enabling error-handling for the Resource State. This is followed by the driver 23 disabling the resource (block 98). After this, an inquiry is made as to whether or not Nodes Match is set to true. If Nodes Match is true, process step (block 100) decrements Node Share Count. Node Share Count is a running tally of the number of shares on local server. If NT Server B 24 is the local server, Node Share Count would represent all shares residing on NT Server B 24. The value of Node Share Count is identical to that of the Local Shares Counter for the driver 23. If Nodes Match is false, process step (block 101) decrements OPNode Share Count. OPNode Share Count represents the number of shares on the opposite server node. If NT Server B 24 is the local server, OPNode Share Count is a running tally of the number of shares local to NT Server A 20. Decision diamond 102 determines whether or not OPNode Share Count is equal to 0. If the answer to this inquiry is yes, the status of the GSM is set to offline (block 103). Otherwise, the status of the GSM is not reassigned. The process continues with an inquiry as to whether or not the value of Node Share Count plus OPNode Share Count equals 0. If the answer to this inquiry is yes, the boolean variable Call User Group is set to true (block 105).

Otherwise, Call User Group is not reassigned. Decision diamond 106 then determines whether or not Nodes Match is set. If so, the driver 23 disables the Local Share Counter (block 107). If Nodes Match is false, no call is made to the driver 23. Process step (block 108) then assigns the Resource State to Cluster Resource Offline, signifying the offline thread process has completed for the MSCS 21. LSM is then set to offline (block 109). After setting LSM to offline, the process releases the GSM Mutex, allowing other programs to write to the resource (block 110). The process then exits (block 111).

Figure 9:
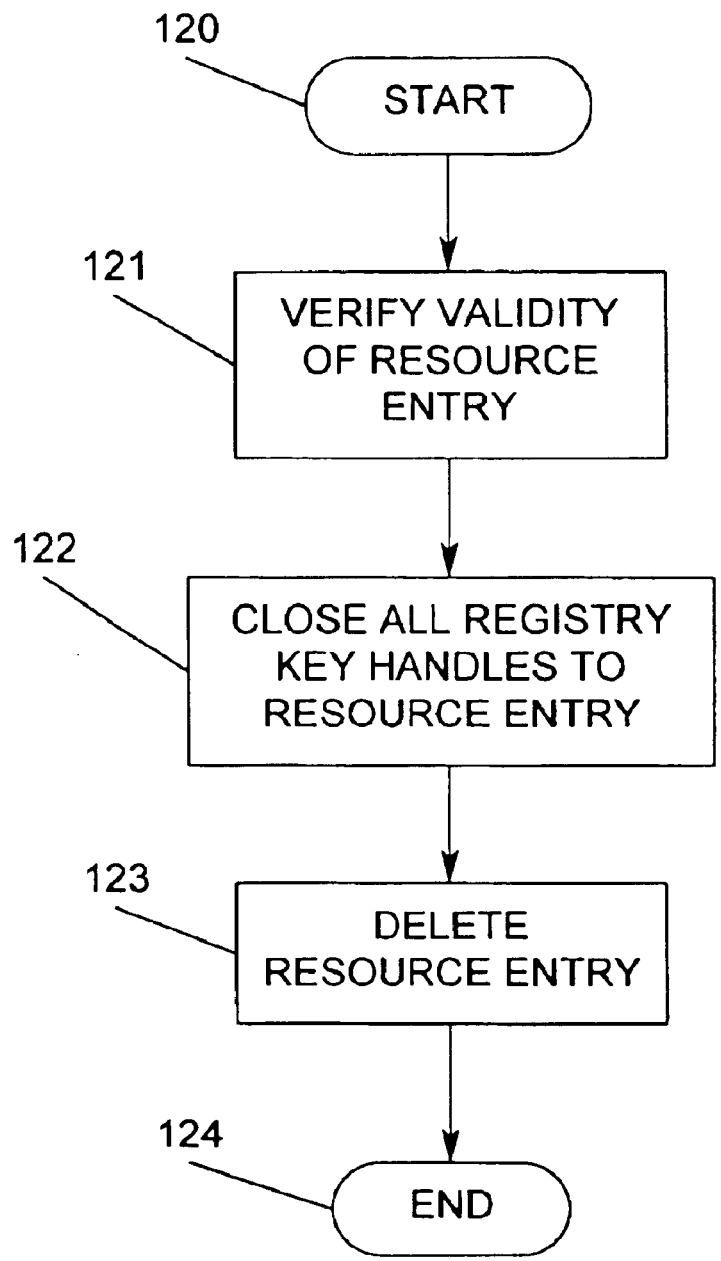
FIG. 9 is a flowchart that illustrates the steps for a close request.

Referring now to FIG. 9, a flowchart illustrating the steps for a close request is shown. The process begins with start bubble 120 followed by a process step (block 121) to verify the validity of the resource entry to be closed. The process continues by closing all registry key handles to the resource entry (block 122). After closing all handles, the resource entry is deleted (block 123). The deletion of the resource entry includes deallocating the resource entry and freeing all memory associated with the resource entry. After deleting the resource entry, the process exits (block 124).

The methods and apparatus of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. In a computer system including at least two server nodes, each of which execute clustered server software, a method for providing a transition from a first one of said server nodes to a second one of said server nodes, said method comprising the steps of:
   a. in response to a request for said transition, initiating a thread for effecting said transition from said first server node to said second server node;
   b. determining if a shared resource is owned by said second node, and if not;
   c. calling a driver to enable functionality of said transition, which transition sets up said shared resource access to said second server node wherein the method further includes a step of counting the number of resources that have transitioned.

2. The method as in claim 1 wherein said transition occurs when said first server has failed and said resource is brought online on said second server.

3. The method as in claim 1 wherein said transition occurs when a server becomes active following a failure and said resource is brought online on said first server and offline on said second server.

4. The method as in claim 1 wherein said transition occurs in response to a selection by a user.

5. The method as in claim 4 wherein said transition occurs in response to said user selection so that said resource is brought online on said second server.

6. The method as in claim 4 wherein said transition occurs in response to said user selection so that said resource is brought online on said first server and offline on said second server.

7. A storage medium encoded with machine-readable computer program code for providing a transition from a first one of said server nodes to a second one of said server nodes, wherein, when the computer program code is executed by a computer, the computer performs the steps of:
   a. in response to a request for said transition, initiating a thread for effecting said transition from said first server node to said second server node;
   b. determining if a shared resource is owned by said second node, and if not;
   c. calling a driver to enable functionality of said transition, which transition sets up said shared resource access to said second server node wherein the computer further performs a step of counting the number of resources that have transitioned.

8. The storage medium as in claim 7 wherein said transition occurs when said first server has failed and said resource is brought online on said second server.

9. The storage medium as in claim 7 wherein said transition occurs when a server becomes active following a failure and said resource is brought online on said first server and offline on said second server.

10. The storage medium as in claim 7 wherein said transition occurs in response to a selection by a user.

11. The storage medium as in claim 10 wherein said transition occurs in response to said user selection so that said resource is brought online on said second server.

12. The storage medium as in claim 10 wherein said transition occurs in response to said user selection so that said resource is brought online on said first server and offline on said second server.

* * * * *